United States Patent [19]

Shenouda

[11] 4,423,083

[45] Dec. 27, 1983

[54] FABRICATED PROTEIN FIBER BUNDLES

[75] Inventor: Soliman Y. K. Shenouda, Tarrytown, N.Y.

[73] Assignee: General Foods Corp., White Plains, N.Y.

[21] Appl. No.: 299,254

[22] Filed: Sep. 3, 1981

Related U.S. Application Data

[63] Continuation-in-part of Ser. No. 137,214, Apr. 4, 1980, abandoned.

[51] Int. Cl.$^3$ ............................................... A23J 3/00
[52] U.S. Cl. .................................... 426/574; 426/656; 426/657; 426/524; 426/802
[58] Field of Search ............... 426/656, 574, 802, 104, 426/524, 657, 575; 260/112 R

[56] References Cited

U.S. PATENT DOCUMENTS

| | | | |
|---|---|---|---|
| 3,093,483 | 6/1963 | Ishler et al. | 426/802 X |
| 3,627,536 | 12/1971 | Arima et al. | 426/802 X |
| 3,801,713 | 4/1974 | Tolstoguzov et al. | 426/574 X |
| 3,881,032 | 4/1975 | Matsumoto et al. | 426/524 X |
| 3,891,776 | 6/1975 | Carpenter et al. | 426/574 |
| 3,922,359 | 11/1975 | Hashizume et al. | 426/656 X |
| 3,982,003 | 9/1976 | Mitchell et al. | 426/574 X |
| 4,001,459 | 1/1977 | Kim et al. | 426/656 |
| 4,084,017 | 4/1978 | Kim et al. | 426/656 |
| 4,126,705 | 11/1978 | Hait | 425/656 X |

FOREIGN PATENT DOCUMENTS

| | | | |
|---|---|---|---|
| 864596 | 9/1978 | Belgium . | |
| 2813577 | 10/1978 | Fed. Rep. of Germany | 426/802 |
| 2371153 | 7/1978 | France | 426/574 |
| 608520 | 4/1978 | U.S.S.R. | 426/574 |

OTHER PUBLICATIONS

"Kelco Algin—Hydrophilic Derivatives of Alginic Acid for Scientific Water Control" Kelco, Division of Merck and Co., Inc. 2nd ed.
Altschul *New Protein Foods*, vol. 1A, Academic Press, N.Y., 435–437, (1974).

*Primary Examiner*—Kenneth M. Schor
*Attorney, Agent, or Firm*—Joyce P. Hill; Joseph T. Harcarik; Daniel J. Donovan

[57] ABSTRACT

A wide variety of meat-like textures are simulated by a process requiring the unidirectional freezing of an aqueous mixture of protein and alginate to form vertically-aligned protein fibers, slicing the frozen mass to form fiber bundles, gelling the alginate in each bundle to reinforce the well-defined fiber structure, permanently heat-setting the protein fiber structure and then adjusting the texture with a sequestering agent. The resulting product has certain textural and nutritional properties of natural meat and can be flavored, colored, texturized, shaped, molded, cooked and substituted for meat.

15 Claims, No Drawings

FABRICATED PROTEIN FIBER BUNDLES

This application is a continuation-in-part of application entitled, Fabricated Protein Fibers, Ser. No. 137,214, filed Apr. 4, 1980 which is now abandoned.

TECHNICAL FIELD

This invention relates to the treatment of untextured protein materials, of animal or vegetable origin, to form a product which is texturally and nutritionally similar to the meat flesh of mammals, poultry or seafood.

In the art of preparing meat analogs, there is a continuing effort being made to duplicate natural meats as closely as possible. Economics provides a major incentive. It has long been recognized that relatively inexpensive protein materials from high-purity secondary protein sources, such as soybeans, can be used to produce a product which simulates natural meat tissue. However, two major obstacles have been encountered by the food processing industry. One obstacle is the complexity and expense of producing a high-quality product by such expensive techniques as fiber spinning. See U.S. Pat. Nos. 2,682,466; 2,730,447; 3,093,483. In addition to the extremely sophisticated equipment required to perform the spinning process, product uniformity is difficult to achieve due to the general complexity of the process and the numerous parameter control problems presented.

The other major obstacle has been the inability to impart the natural and accustomed chewy, fibrous texture to the secondary protein source materials. Natural meat products inherently possess a texture giving them a definite "mouthfeel" which is clearly recognized and strongly preferred. In fact, a number of processes and apparatuses have been developed for treating secondary protein source material to produce a texturized product having public acceptance. For example, Japanese Patent Nos. 48-21,502 and 48-34,228, and French Patent Nos. 2,130,254 and 2,130,282 describe the production of fibrous protein masses by freezing a protein solution or dispersion and heating the frozen mass to heat set the protein.

U.S. Pat. Nos. 4,001,459, 4,084,017 and 4,087,566 describe a process including freezing a protein solution with the employment of a freeze drying step prior to heat setting. In U.S. Pat. No. 4,087,566 it is acknowledged that the use of freeze drying is quite costly and accordingly suggests the use of an aqueous alchohol solution to stabilize the protein in the frozen mass rather than freeze drying.

Mars Ltd. (Belgium Patent No. 864,596) describes the formation of a fibrous or laminar protein structure by freezing a protein/alginate solution or dispersion then fixing the fibrous structure with a gelling mechanism. However, the Mars Ltd. product does not have the macro-parallel fibrous structure forming bundles resembling the natural structure of animal flesh.

Indeed, those meat analog products which have found there way to the supermarket shelves generally have been met with little or no consumer acceptance and have generally been withdrawn. Especially where consumer preferences rather than nutritional values often dictate the fate of food products, a successful texturized secondary protein material simply must possess taste, color and mouthfeel characteristics similar to natural meat.

Given the diminishing availability and escalating costs of natural meat protein products, it is clear that an inexpensive, consumer-acceptacle, high protein food product based on texturized secondary protein source materials is urgently needed.

Accordingly, the present invention is directed to a process for changing globular amorphous particles of secondary protein materials into fibrous, continuous phase protein material having structural integrity and consumer acceptance.

DISCLOSURE OF THE INVENTION

According to the present invention, a wide variety of meat-like textures can be simulated using a wide variety of protein materials. The common chracteristic of all of these products is the presence of well-defined, well-ordered fibers stacked parallelly in bundles. The fibers are produced by the present method using a thermally irreversible gum, a heat-coagulable protein of vegetable and/or animal origin and water. As used in this invention, the phrase "thermally irreversible gum" refers to those sol-like polymeric carbohydrate gel precursors capable of forming a gel which will not reverse into a sol upon heating at temperatures required to cook or heat the food product, such heat treatment ranging from gentle warming to deep-fat frying. While only exemplary of suitable thermally irreversible gums, a water-soluble alginate; e.g., sodium alginate, will be employed interchangeably with "thermally irreversible gum" in the following discussion.

By employing a water-soluble alginate with animal and/or vegetable protein, it is possible to easily balance the textural, taste and nutritional characteristics of the fibers to provide a textured protein material having the desired characteristics. The use of a high-viscosity alginate/protein solution permits the addition of water-insoluble protein such as fish protein concentrate. The water-insoluble protein is uniformly suspended throughout the solution.

Among the features important to the present invention are: cooling an aqueous protein/alginate slurry in a direction and at a rate effective to produce well-defined, well-ordered ice crystals, partitioning the resulting frozen mass into fiber bundles, gelling the alginate in each fiber bundle prior to heat setting to assure retention of the fibrous structure defined by the ice crystals and modifying the texture of the fiber bundles with a sequestering agent.

Any edible protein, or combination of proteins, can be employed in the process of the present invention, providing that the sole protein or, in the case of combinations, at least one of the proteins is soluble or partially soluble in water and can be coagulated by heat treatment. In general, proteins having excellent solubility provide excellent, distinct fibrous structures—probably because the ice crystals can grow freely, unrestricted by undissolved solids. However, protein solutions containing considerable water-insoluble material, such as soy flour, meat homogenates, and fish flour can also be employed with good results to form fibrous structures according to the present invention. Representative of the protein materials which can be employed to give excellent results according to the present process are soy milk, soy isolates, whole milk, meat slurries, sea animal protein slurries, gluten, soy flour, wheat protein concentrate, milk whey, egg protein, blood protein, single cell protein and the like.

The final texture of the products depends in part on the protein source employed, concentration of water-soluble alginate in the starting mixture, the viscosity of the alginate compound, the thickness of slicing, type and concentration of sequestrant, as well as the additives such as flavoring, fillers, fat, carbohydrates, salts, and the like. For example, the products prepared from milk protein and egg protein have a juicy, smooth, soft texture with good fiber tensile strength resembling crab meat. Soy flour, on the other hand, gives a product with lower tensile strength than the milk, and egg protein mixture but this type of tenderness is desired in some products either alone or as a component with another protein material.

The protein, from whatever source, is admixed with water and a water-soluble alginate to form an aqueous protein/alginate mixture wherein at least a portion of the protein is dissolved in the water. The aqueous protein/alginate mixture can be characterized as a solution, dispersion or suspension of protein, alginate and water.

The thermally irreversible gum, such as alginate, suitable for this invention is soluble in water and serves as a thickening agent for the aqueous solution. Alkali metal alginates are commonly employed in various viscosity ranges. Sodium alginate is currently preferred. The concentration of alginate used is between 0.25 to about 3% based on the total weight of the aqueous mixture, preferably 0.75% to about 1%.

The aqueous protein/alginate mixture is easily obtained by mixing the same in water. If necessary, the protein material can be finely divided or comminuted either before or after mixing with the water. The presence of soluble and/or insoluble non-coagulating materials is acceptable, and indeed in some cases desirable, so long as it does not adversely affect the desirable qualities of the fiber structure for a particular application. In some cases, the presence or addition of fat would modify the tensile properties of the fibers. However, in other cases, a reduced tensile strength would be desirable as it would impart a more tender texture to the product. Thus, those additives normally employed in forming fibrous meat analog products can be employed according to the present invention; it being realized that the process of the present invention provides a process capable of widely modifying the compositional features of the fiber forming material to obtain a wide variety of textural and nutritional variations from the single basic process. It is an added advantage of the present invention that relatively high fat contents can be employed and a good fiber structure obtained.

The solids concentration of the mixture can affect both product texture and processing efficiency. It is generally desirable to maintain low solids concentrations. One reason is that there is a tendency to diminish distinct fibrous structure by increasing the concentration of solids. Typically, the solids will not exceed about 25%, and preferably not more than about 10% of the mixture on a weight basis. When the solids concentration increases, the fiber structure is less well-defined. However, processing at excessively low concentrations loses economy due to the increased costs of handling the water. The costs for energy, vessels, transfer and storage equipment increase rapidly as concentration is reduced. However, the quality of the fibers produced at low concentrations is high. It is therefore necessary to determine optimum concentration for freezing which will be anywhere from about 3% to about 20% protein based upon the total weight of the aqueous protein mixture. It is clear, however, that the optima for particular protein and additive materials may vary widely within this range and at times extend beyond this range. Those skilled in the art will be able to determine the optima for the particular systems employed, especially with the knowledge of the economics of their particular processing equipment and procedures. Reference to the examples below will provide those skilled in the art with working examples of a number of different systems. Any concentration effective to produce substantially independent, oriented fibers is acceptable according to the present invention. The particular concentration must be determined in each case for the balance of product physical properties and processing efficiency which is desirable and justified.

Once prepared, the aqueous protein/alginate mixture is frozen by cooling according to a defined directional pattern to provide a well-defined, well-ordered fibrous structure produced by the ice crystals. As the water is frozen to ice crystals, the remaining protein/alginate mixture becomes more concentrated. The formation of the ice crystals separates the solid materials into distinct, generally parallel aligned zones creating substantially independent fibers. Any means capable of accomplishing this result is suitable according to the present invention. The ice crystals form in a latice-work entrapping solid material in orderly fiber-like portions between the elongated ice crystals. The zones of protein material are separated from each other almost completely—forming substantially independent fibers of protein when coagulated. However, the zones of protein are not completely independent of each other and are joined at sufficient locations to bind the individual zones into a branched or cross-linked structure. The degree of binding achieved is just sufficient to provide a cohesiveness to the final product similar to cooked meat, and does not destroy the substantially independent fibers. This binding, achieved during the formation of the fibers, helps maintain the desired fiber alignment.

Freezing is obtainable by cooling at least one surface, preferably one surface or two opposed surfaces, of the mixture to below the freezing temperature of the mixture. The cooling or refrigerating preferably causes freezing to take place throughout the thickness of the mass the produce generally parallel fibers, aligned generally perpendicularly to the cooling surfaces. Desirably, the cooling surfaces or surfaces will be planar; however, they can have any other regular or irregular configuration. For example, a single cooling surface can be employed having a hemispherical, spherical or cylindrical configuration in contact with the aqueous protein/alginate mixture. In these exemplary situations, the ice crystals, and thus the protein fibers, would form generally perpendicularly to tangents to the surface, radiating generally toward the center. During freezing, a boundary between the frozen mixture and the liquid mixture appears and moves in the direction of cooling. At typical freezing temperatures employed according to the present invention, and where the cooling surface is not highly irregular, the boundary will generally conform to the shape of the cooled surface of the protein/alginate mixture. However, under other conditions according to the present invention, the boundary will assume a somewhat modified shape. It is to be understood that after an initial thickness of the mixture has been frozen, the moving boundary of freezing becomes the cooling surface through which heat transfer takes place. It is this moving boundary which then controls the pattern of the formation of ice crystals and, therefore, fibers. The important consideration in all cases is the production of well-defined fibers having an orderly alignment similar to natural meat. If needed, the surfaces of the mass not in contact with the cooling source can be insulated to reduce heat transfer at these surfaces. It is observed, in most cases, that the surfaces not in contact with the one or the two opposed cooling surfaces exhibit a thickness of somewhat randomly oriented fibers. This is because directional cooling at these edges is difficult to obtain due to heat transfer with external sources. This edge portion can be either retained in the final product or severed therefrom such as by cutting with a knife, heated wire or the like and recycled, if desired. It is also noted that where cooling is affected from two opposed surfaces, horizontal surfaces of discontinuity appear, bisecting the thickness of the frozen mass. This is apparently due to the independent crystal growth from each of the opposed surfaces toward a plane of contact in the middle of the mass.

Many cooling sources can be employed according to the present invention. For example, the aqueous protein/alginate mixture can simply be placed in a pan and the pan set on a piece of dry ice or submerged to a slight depth (e.g., 3.17 mm) in a cold liquid such as liquid nitrogen, ethylene glycol, brine, or any other refrigerant. Alternatively, a container of the aqueous protein/alginate material can be placed on a plate freezer or between two opposed plate freezers. Also suitable would be a moving belt type freezer of the kind illustrated in U.S. Pat. Nos. 3,253,420 and 3,606,763. The temperature employed can be any temperature effective to yield substantially independent, aligned ice crystals. It is noted that while the rate of cooling is generally not a factor with regard to the formation of well-defined, well-ordered, elongated fibers where the cooling is substantially unidirectional, the rate of cooling does definitely affect the size and shape of the crystal. Rapid cooling rates result in the formation of minute, microscopic ice crystals. Slower cooling or freezing rates result in the formation of long, needle-like ice crystals. Preferred cooling rates, defined in terms of the rate of advance of the freezing boundary, range from about 0.61 to about 30.4 cm/hr, more preferably from about 0.91 to about 15.2 cm/hr.

While there is nothing presently believed critical in the temperature of the protein/alginate solution or slurry prior to the freezing step, it is considered preferable to reduce the temperature of the solution or slurry to as close to the freezing point as possible prior to subjecting it to freezing. This is preferred at the present time solely on the basis of economics. It is less expensive to cool a liquid by conventional means with turbulence and high surface contact with the heat transfer media than to cool by means of the single or two opposed heat transfer elements employed for freezing. It is cautioned, however, that the liquid mixture should not be supercooled prior to the freezing operation as this will result in too rapid, random cooling and will produce an undesirable, random fiber structure in the product. Also in this regard, the frozen mass can now be stored at temperatures which are only slightly below the freezing point of the mass for extended periods of time. Storage under these conditions will not cause recrystalization of the ice and randomization of the fibrous structure as described in U.S. Pat. No. 4,001,459.

After freezing, the crystalline structure of the material can be easily observed, if desired, by fracturing the frozen mass and observing it visually. To retain the integrity of the individual protein fibers thus formed, it is necessary to temporarily set the fibrous structure prior to a permanent heat set. It is imperative that this sequence be followed or the heat setting step will result in excessive bonding of the individual fibers due to melting of the ice crystal lattice separating them. In order to produce a natural meat-like texture it has been found necessary to first slice the frozen mass into discrete fiber bundles followed by a gelation step which quickly sets the exterior of the fiber bundles and thereafter gels the fibrous structure within each of the fiber bundles. Thus, prior to a final heat set, the fibrous mass is set up as a plurality of fiber bundles which structurally resemble the actual non-homogenous structure of natural meat. Without a slicing step the fibrous mass would be gelled and then heat set to a substantially homogenous fibrous mass unlike the texture of natural meat. For many meat analogs, and especially fish analogs, these well-defined, well-ordered, fibrous bundles are highly desired. Further, the formation of discrete fiber bundles permits unique texture modifications which were not heretofore possible.

It may be advantageous to temper the frozen mass at temperatures below freezing (i.e., $-1°$ C. to $-10°$ C.) to facilitate the slicing of the frozen mass into fiber bundles. Indeed, one of the surprising and unexpected results of this invention was the ability to maintain well-defined, well-ordered, fiber-like structures throughout all process steps subsequent to the freeze alignment of fibers. These well-defined, well-ordered fibers give the desired texture and elasticity desirable in a final meat analog.

Slicing of the solid, frozen mass may be by any conventional manner using conventional equipment. Slicing must be in a direction parallel to the longitudinal axis of the ice crystal formation to form fiber bundles. A "fiber bundle" is defined as a small band or group of mostly parallel fibers. It is critical that the thickness of the slices and temperature of the gelling bath be controlled so that the rate of gelling ion infusion from the gelling bath into the melting fiber-like structure proceed at the same speed as the melting rate of ice crystals in the fiber-like structure. During the gelling step, the protein alginate fibers which were formed via the preceding unidirectional freezing step are individually reinforced and maintained in the shape of well-ordered, well-defined fiber bundles.

The recommended range for the thickness of each slice is from about 1.3 to 8.0 millimeters (mm) (0.05 to 0.31 inches) with the peferred range being from 2.0 to 2.3 mm (0.08 to 0.09 in.)

A suitable temperature range for the gelling bath is from about 0° C. to about 23° C. for a time of from about 30 minutes up to several hours depending on the amount of fiber bundles in solution and thickness of the fiber bundles. For example, slices having a thickness of 3.5–8.0 mm could possibly maintain their macro-fibrous structure if the temperature of the gelling bath is kept at about 0° C. during the gelling process for a period of from 4–8 hours or longer. Slices thicker than 8.0 mm result in pieces which lose their internal fibrous structure, i.e., the gelling ions gel the outer surface of the slice while the internal portion of the slice melts, losing the fibrous structure and forming a paste-like core. On the other hand, slices having a thickness of less than 1.3 mm result in non-coherent, loose individual fibers and do not resemble fiber bundles.

The subdivided frozen mass or bundles are immersed in an appropriate bath to gel the water-soluble alginate in each fiber bundle. Gelling may be effected by lowering the pH of the protein/alginate mixture or by immersion in a nonaqueous water miscible solvent such as alcohol or acetone, or immersion in a bath containing calcium salts. Gelling serves to reinforce the well-defined, well-ordered, fiber-like structure in each bundle. The details of alginate gelling are well known to those skilled in the art and form no part of the present invention. A detailed discussion of gelling techniques is found in *Kelco-Algin/Hydrophilic Derivatives of Alginic Acid for Scientific Water Control*, Kelco-Division of Merck Co., INc., Chicago, Ill., and is incorporated herein by reference. Currently, gelling by calcium ion exchange is preferred. A bath containing calcium salts selected from the group consisting of calcium chloride, calcium acetate, calcium glycol phosphate and calcium proprionate may be used. Calcium chloride is the most preferred gelling agent.

While only exemplary of suitable gelling agents which can be employed, calcium chloride will be employed as the gelling agent in the following discussion for conciseness.

When the frozen slices of the protein/alginate mixture prepared in the manner described above are brought into contact with calcium chloride in a coagulation bath, calcium ions are exchanged for the sodium ions in the alginate and a chemically-reversible gel is formed. Polymeric carbohydrate materials such as sodium alginate have a high calcium sensitivity and are thus quite suitable for the present process in that they can be reacted with various water-soluble calcium salts, such as calcium chloride, and the like. The calcium salts serve either separate or dual roles as gelling cations and/or protein-coagulating or pecipitating agents.

The exact times, temperatures, and concentration of calcium salts employed will vary with the thickness of the slices of the frozen protein/alginate mixture but can be easily determinable by those skilled in the art for a wide variety of products. Reference to the examples below will show a number of specific gel treatment operations which will guide those skilled in the art. All that is necessary is that the gelling step be sufficient in time and intensity to coagulate the alginate surrounding individual fibers in the well-ordered, well-defined fiber bundles.

Once the alginate in each fiber bundle has been gelled, the fiber bundles can be heat set immediately and then stored for subsequent use. Heat setting insolubilizes or coagulates the protein and permanently fixes the protein material in fibrous form.

The amount of heat treatment, with or without pressure, to stabilize the product varies with the type of protein materials used. By way of example, dry soy milk fibers are preferably heat treated in an autoclave at about 120° C. for 10 minutes while egg albumen is heated at 105° C. for about 2 minutes. Any combination of time, temperature, and pressure effective to heat set the protein into substantially independent fiber can be employed according to the present invention. It appears that heat treatment at a temperature ranging from about 100° to about 120° C. for a time of from about 2 to about 30 minutes is adequate depending upon the texture desired in the final product. The exact times, temperatures, and pressures employed will be easily determinable by those skilled in the art for a wide variety of products. Reference to the examples below will show a number of specific heat treatment operations which will guide those skilled in the art.

Typical of the heating means which can be employed are conventional autoclave or steam chamber devices capable of producing pressures of up to about 20 psig and temperatures of up to about 130° C. Also suitable would be microwave heating, boiling water, boiling brine or oil bath. The specific heating means employed is not critical to the present invention. All that is necessary is that the heat be sufficient in time and intensity to coagulate or immobilize the protein sufficiently to substantially prevent loss of the individual protein fibers. Immersion in an oil bath at temperatures around 105° C. is currently preferred for higher yield.

After heat setting, the fiber bundles are soaked in water to remove excess undesirable salts such as calcium chloride, and then soaked in water containing a sequestering agent for a period of time effective to modify the texture, and enhance the water-retention properties of the final fibers. The treatment of the heat-set fiber bundles with a dilute aqueous solution containing a sequestering agent also affects the rheological properties of the fibers. Mold treatment, e.g., soaking the fiber bundles in a 0.05% Na-TPP solution for 4 minutes, gives fibers which are described as: hard, firm, chewy, not very moist, cohesive; resembling chicken breast meat. Stronger treatment, e.g., soaking the fiber bundles in a 0.2% Na-TPP solution for 10 minutes, gives fibers described as: juicy, springy, elastic, resilient, having high moisture release; and resembling meat from crab or other shellfish. The ability to control the texture of the completely gelled and heat-set protein analog of this invention using a sequestering agent in varying aqueous concentrations and for varying periods of time unexpectedly led to the ability to simulate a wide variety of meat-like textures using one protein/alginate formulation.

A suitable sequestering agent may be selected from the group of compounds consisting of sodium or potassium tripolyphosphates, citrates, pyrophosphates, orthophosphates and tetrasodium ethylenediamine tetraacetate. Using sodium tripolyphosphate as an example, a sequestering bath may contain up to about 0.5% of the sequestering agent based on the total weight of the solution. Treatment of the coagulated protein fiber bundles with an aqueous solution of a sequestering agent gave the expected result of softening the gelled fiber bundles. However, it was unexpected that the degree of softness could be controlled while simultaneously achieving different meaty textures, e.g., elasticity, chewiness, cohesiveness, moistness and obtain a rheology compatible with natural meat flesh such as pork, beef, veal, poultry, seafood, etc.

The resulting white, bland-tasting protein product is separated from the bath containing the sequestering agent and may be modified and improved upon by the addition of meat-flavoring agents, color agents and other property-imparting ingredients.

The process may be terminated at this point, with the partially prepared food product in a condition to be sold for final processing at any desired level. Alternatively, the food processing can continue to either partially or completely finish the edible product.

For instance, minute quantities of sodium chloride, monosodium glutamate, or the like may be added to modify texture and flavor. Natural meat products, selected from the group consisting of beef, pork, shrimp, crab and the like, may be comminuted or reduced to a paste and mixed with the product of this invention along with additional binder-like substances to form a matrix which may be molded, shaped, extruded and formed as a finished product.

Accordingly, a completely finished edible product may be marketed with or without a batter-coating for cooking, baking, frying or the like.

The following examples serve as illustrations of several of the applications of the invention, and are not to be taken as limiting in any manner. Unless otherwise indicated, all parts and percentages are by weight.

EXAMPLE 1

Shrimp Analog

An aqueous protein slurry having the following composition by weight is mixed and poured into an aluminum pan forming a 3.8 cm layer of the aqueous slurry on the bottom of the pan.

| Components | Percent by Weight |
| --- | --- |
| Egg albumen (powdered) | 10.0 |
| Milk casein | 10.0 |
| Sodium alginate (medium viscosity) | 1.0 |
| Water (to 100%) | 79.0 |

The pan containing the aqueous protein slurry is placed over dry ice ($-79°$ C.) which extends across the entire bottom surface of the pan. Unidirectional ice crystals, substantially perpendicular to the bottom of the pan, are generated. The mass is completely frozen in about 30 minutes. The frozen mass is tempered to a temperature just below freezing ($-10°$ C. to about $-5°$ C.) and is sliced with a mechanical meat slicer to form segments that are 1.8 mm thick. The slicing is in a direction parallel to the longitudinal axis of the ice crystal formation; i.e., parallel to the formed fibers. The slices (fiber bundles) are soaked in a chilled (4° C.), aqueous calcium chloride solution containing 5% calcium chloride to gel the alginate component in each slice (fiber bundle).

The gelled fiber bundles are strained from the calcium chloride solution and the protein in each fiber bundle is set by placing the fiber bundles in an oil bath maintained at temperatures between 104°–121° C. for from 1 to 5 minutes.

The gelled, heat-set fiber bundles are soaked in water to remove excess calcium and are then treated by immersion in a dilute aqueous solution of disodium tripolyphosphate (Na-TPP) (0.1 to 0.2% Na-TPP) for from 5 to 30 minutes to soften the texture and sequester any remaining calcium salts and other salts contributing off-flavors.

The resulting fiber bundles are washed with water, mixed with a shrimp flavor, and a protein-based binder to form a matrix which is put into a shrimp-shaped mold and heat set at 100 C. for 10 minutes.

EXAMPLE 2

Scallop Analog

The procedure of Example 1 is repeated, except the aqueous protein slurry comprises fish protein concentrate (FPC) and egg albumen in a 1:1 weight ratio and the sodium alginate is of high viscosity.

The use of a high protein concentration, i.e., about 25%, of the above formulation and thicker slices (0.8 cm in thickness) gives products very similar to scallop meat.

EXAMPLE 3

Blood Protein Product

A fibrous blood protein product is prepared according to the process of Example 1, with the exception that the aqueous protein slurry comprises 10% blood plasma and low viscosity alginate. The fibers are white to creamy in color, with no offensive blood aroma. The chew and texture is similar to the meat flesh of mammals.

Varied Protein Source Materials

EXAMPLE 4

The procedure of Example 1 is repeated, but this time the aqueous protein slurry comprises single cell protein (SCP), egg albumen and casein in a weight ratio of 1:2:2 with regard to the formulation of an aqueous protein slurry having 10% protein based on the total weight of the slurry.

EXAMPLE 5

A fibrous lactalbumin protein matrix comprising 5% lactalbumin (Solac, sold by New Zealand Milk Products) and 5% milk casein is prepared according to the procedure described in Example 1.

EXAMPLE 6

Using the procedure described in Example 1, a fibrous soy protein product is prepared from soy protein isolate, denatured lactalbumin (Tetroid, sold by New Zealand Milk Products), milk casein and egg albumen in a weight ratio of 1:1:1:1 for each of the four components. The Protein concentration is 20% based on the total weight of the aqueous protein slurry.

EXAMPLE 7

A dry mixture of 4.5% milk casein, 4.5% egg albumen and 0.75 sodium alginate is suspended in water. The solution is deareated, freeze aligned, tempered and sliced as in Example 1. The resulting fiber bundles are soaked in isopropyl alcohol to gel the alginate. The gelled fiber bundles are then air dried using a fluidized-bed dryer which also heat sets the protein. The fiber bundles can be stored at room temperature (23° C.) for several weeks. If stored, dried fiber bundles are rehydrated in water to a 70–80% moisture content and further texture modification is effected with an aqueous solution of tetrasodium ethylenedianine tetraacetate (EDTA).

EXAMPLE 8

Chicken Meat Analog

The procedure of Example 7 is repeated, except the sliced fiber bundles are soaked in a citric acid solution having a pH value of 3 to gel the alginate in each fiber bundle. The gelled fibers are heat set in steam or boiling water. The texture is further modified by readjusting the pH to about 7. Further modification is accomplished by using sequesterants as previously described. The protein fiber bundles are compressed under heat (100° C.) with or without a binder to form meat chunks similar in texture and color to chicken meat.

EXAMPLE 9

Crabmeat Analog

An aqueous protein slurry comprising 4% milk casein, 4% egg albumen and 1.5% low viscosity sodium alginate is frozen unidirectionally, tempered and sliced as described in Example 1. The slices are then soaked in a chilled calcium proprionate solution to gel the alginate in each fiber bundle. The gelled fiber bundles are heat set by microwave radiation. The excess calcium ions are removed by soaking the fiber bundles in boiling water for from 3–10 minutes. The texture of the fiber bundles are further modified with a dilute Na-TPP solution as described in Example 1. The fiber bundles are then flavored with crab flavoring, monosodium glutamate, a mixture of disodium-5'-inosinate and disodium-5'-guanylate (Ribotide TM), and sweetened (e.g., with glycine, alanine or sugar). The white, juicy, elastic and tender fibers resemble crabmeat in color, shape, texture and taste.

EXAMPLE 10

Texture Modification of Fiber Bundles

Crabmeat analog of Example 9 is prepared and compared with natural crab meat before and after treatment with a sequestering agent. Freeze aligned and freeze dried fibers prepared according to U.S. Pat. No. 4,084,017 (Kim et al.) were also evaluated but are not considered a part of this invention. Objective Textural Measurements (OTM) using Kramer Shear Press (KSP) manufactured by Food Technology Corporation, Rockville, Md., and Instron Universal Testing Instruments (Instron) manufactured by Instron Corporation, Canton, Mass. were used to measure the texture of natural and simulated crab meats. The results are reported in Table I below.

TABLE I

| OTM Test | Natural Crab Meat | Example 9 w/o Na-TPP Treatment | Example 9 w/ Na-TPP Treatment | Freeze-dried Fibers from U.S. Pat. No. 4,084,017 |
|---|---|---|---|---|
| KSP (maximum force-lb./g.) | 7.7 ± 0.8 | 22.9 | 6.0 | 4.2 |
| Instron: Compression/ Shear firmness (lb./mm) | 1.3 ± 0.4 | 2.2 | 1.4 | 2.1 |

The above results show that a dilute Na-TPP solution (0.1–0.2% Na-TPP based on the total weight of water) can be used to convert a very tough, firm analog product to a juicy, moist, resilient texture similar to that of natural crab meat. The fibers were also tasted by expert panelist who confirmed that the fiber bundles of this invention are very close to natural crab meat in all textural aspects.

What is claimed is:

1. A process for preparing white, bland-tasting protein fiber bundles which are texturally and nutritionally similar to the meat flesh of mammals, poultry or seafood, said process comprising the steps of:
   (a) preparing a mixture comprising heat coaguable protein which is water-soluble or partially water-soluble, a water-soluble alginate and water;
   (b) cooling the mixture to unidirectionally freeze the water into elongated ice crystals and to separate the protein into well-defined, well-ordered, substantially independent fibers;
   (c) slicing the solid mass of step (b) in a direction parallel to the longitudinal axis of the ice crystal formation to form fiber bundles, each slice having a predetermined thickness
   (d) melting the ice crystals;
   (e) gelling, via infusion of gelation ions, the water-soluble alginate in each fiber bundle to reinforce the well-defined, well-ordered, fiber-like structure wherein the rate of gelling the water-soluble alginate is at the same speed as the melting rate of ice crystals in the fiber bundles and wherein the thickness of each slice permits ion infusion into the solid mass such that the rate of gelling is at the same speed as the rate of melting;
   (f) heating the resulting fiber bundles to coagulate the protein;
   (g) treating the coagulated protein fiber bundles with an aqueous solution of a sequestering agent for texture modification and to extract undesirable salts contributing off-flavors; and
   (h) separating the white, bland-tasting protein fiber bundles from the bath containing the sequestering agent.

2. The process according to claim 1 wherein the cooling of step (b) is effected by cooling a single surface of the mixture.

3. A process according to claim 2 wherein the single surface is planar.

4. A process according to claim 2 wherein the single surface is spherical, hemispherical or cylindrical.

5. A process according to claim 1 wherein the cooling of step (b) is effected by cooling two opposed surfaces of the mixture.

6. A process according to claim 1 wherein the mixture comprising heat coagulable protein has a protein content of about 10 to about 25 percent by weight and a water-soluble alginate content of from 0.25 to about 3 percent by weight.

7. A process according to claim 1 wherein the gelling of step (e) is effected by adding calcium salts selecting from the group consisting of calcium chloride, calcium acetate, calcium glycol phosphate and calcium propionate.

8. A process according to claim 7 wherein gelling is effected by adding calcium chloride.

9. A process according to claim 1 wherein the sequestering agent of step (g) is selected from the group consisting of sodium or potassium tripolyphosphate, citrates, pyrophosphates, orthophosphates and tetrasodium ethylenediamine tetraacetate.

10. A process according to claim 1 wherein the white, bland-tasting protein fiber bundles are modified by the addition of meat flavorings, food binders coloring and food grade texturizers.

11. A process of preparing a meat analog comprising the steps of obtaining the modified protein fiber bundles of claim 10 and, thereafter extruding, shaping and molding.

12. A process of preparing protein fiber bundles as defined in claim 11 wherein the meat flavorings are selected from the group consisting of shrimp, crab, beef, pork and chicken.

13. The process according to claim 1 wherein the mixture comprising heat-coagulable and water-soluble or partially water-soluble protein also contains water-insoluble protein material.

14. The process according to claim 13 wherein the protein material is selected from the group consisting of soy flour, meat homogenate and fish homogenate.

15. The process according to claim 14 wherein the protein material comprises fish protein concentrate.

* * * * *